United States Patent [19]

Kwech et al.

[11] 4,083,730

[45] Apr. 11, 1978

[54] CEMENT, PROCESS AND DEVICE FOR ITS PRODUCTION

[75] Inventors: Ludwig Kwech, Kaltenleutgeben; Fritz Jung, Vienna, both of Austria

[73] Assignee: Perlmooser Zementwerke A.G., Austria

[21] Appl. No.: 706,948

[22] Filed: Jul. 20, 1976

[30] Foreign Application Priority Data

Jul. 22, 1975 Austria .............................. 5652/75
Aug. 27, 1975 Austria .............................. 6614/75

[51] Int. Cl.$^2$ .................................................. C04B 7/02
[52] U.S. Cl. .......................................... 106/89; 106/100
[58] Field of Search ........................ 106/89, 100, 102

[56] References Cited

U.S. PATENT DOCUMENTS

| 2,438,488 | 3/1948 | Anderson et al. | 106/100 |
| 3,645,762 | 2/1972 | Mikoteit et al. | 106/89 |

*Primary Examiner*—J. Poer
*Attorney, Agent, or Firm*—Holman & Stern

[57] ABSTRACT

A cement and process of producing the cement is disclosed wherein the cement comprises at least two clinkers, one being a Portland cement clinker of conventional composition and at least one other clinker of low-calcium content or marl clinker. This marl clinker is heated between 450° C and 1250° C and contains hydratizable mineral phases of low-calcium content and 0–30% by weight related to the marl clinker of glass phases.

27 Claims, 11 Drawing Figures

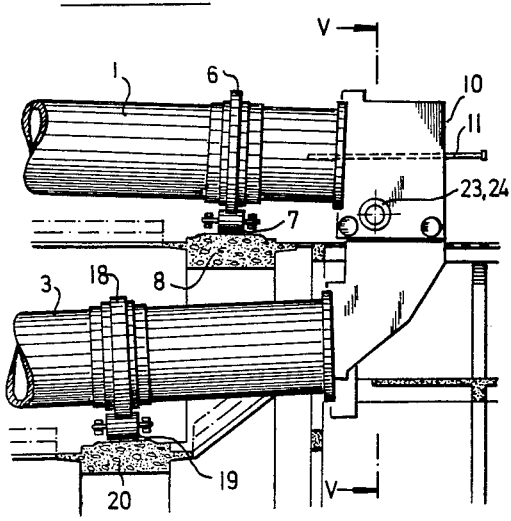
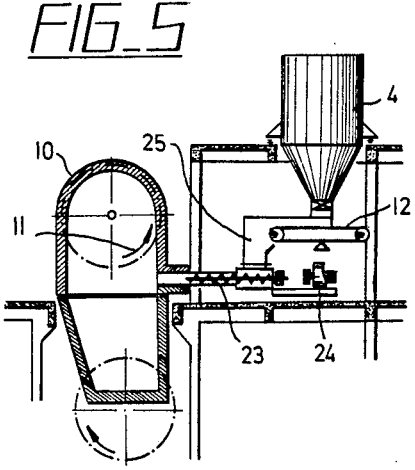
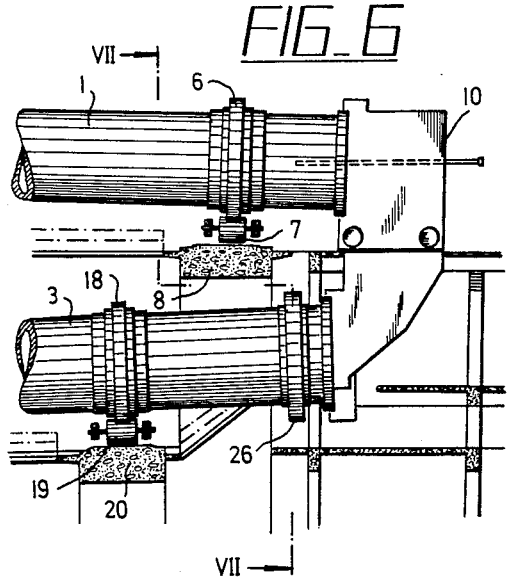
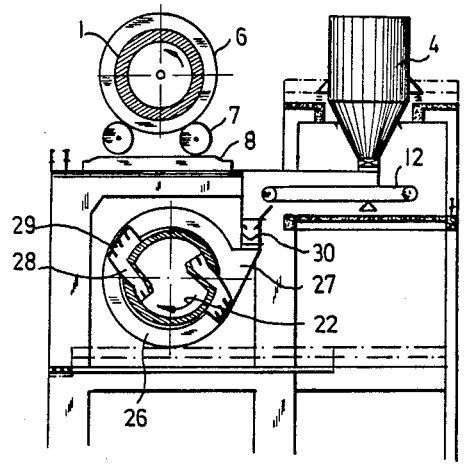

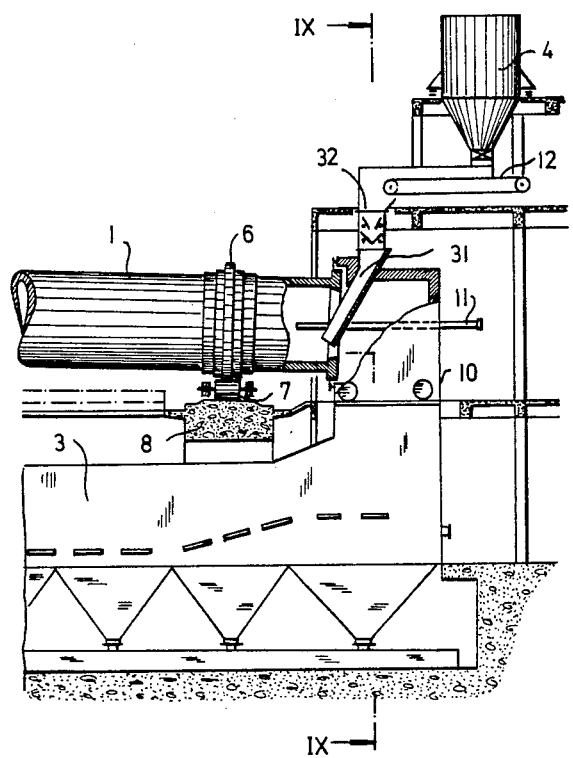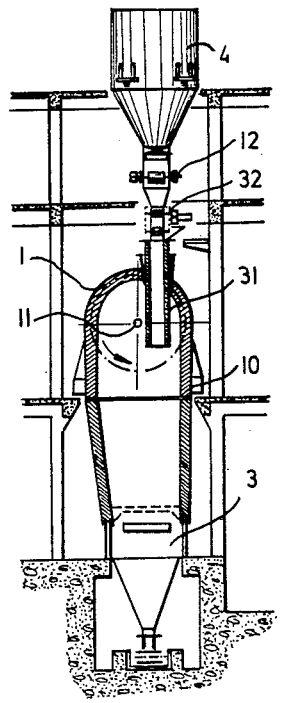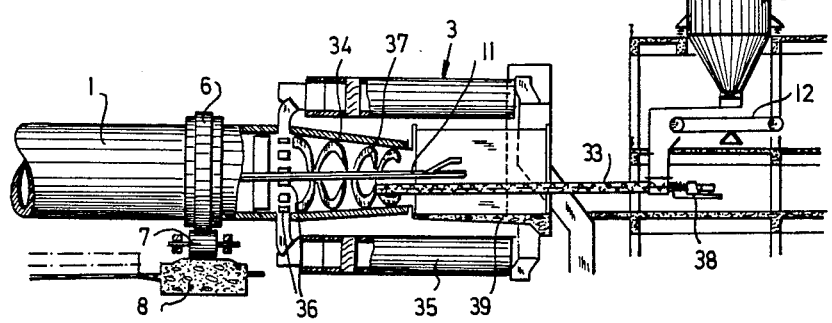

CEMENT, PROCESS AND DEVICE FOR ITS PRODUCTION

Cement raw meal consists essentially of calcium carbonate, on the one hand, and hydraulic factors of silicon dioxide, alumina and ferric oxide, on the other hand. These substances are formed during the burning of the clinker to form the socalled clinker minerals which cause the hydraulic setting of the finely ground cement. The raw meal should contain at least as much calcium carbonate as corresponds to the maximum amount which can be bound by the hydraulic factors during burning. Depending upon the composition of the hydraulic factors, a cement raw mixture should thus contain about 75 to 78 percent calcium carbonate, with the calcium carbonate content of the cement raw meal fluctuating by only tenths of a percent. A suitable raw mixture can for instance be produced be employing ¾ limestone and ¼ clay or by using only one marl in which the lime present is a mixture with the hydraulic factors defined above naturally contained, and by correcting the calcium carbonate content of this marl by means of either limestone or clay. In order to secure the required degree of reaction between the calcium carbonate and the hydraulic factors during the burning of the clinker, the components must be finely ground and intimately mixed, and blended.

In the historical beginnings of cement production, when chemical interrelations were still unknown, the only cement raw mixture to be used was a marl in which nature had provided the proper ratio of limestone to hydraulic factors. Deposits of such marls are extremely rare and comparatively small. The intimate, fine distribution of limestone and hydraulic factors made it largely superfluous, however, to crush and homogenise the raw materials prior to burning. Today, cement raw meal, the raw material for burning Portland cement clinker, is virtually always composed of several components, for instance limestone and marl of low lime content. It has been previously mentioned that comminution and homogenization of the various components is indispensable in order to secure proper reaction of limestone and hydraulic factors. The raw mixture has to be comminuted and homogenized to the same extent even in the situation when one of the components of the raw mixture, for instance the marl, contains limestone and hydraulic factors sufficiently finely distributed by nature, which is generally the case. In these cases, the intimate distribution of the limestone and the hydraulic factors in the marl can not practically be used in saving an essential part of the extremely high costs brought about by the comminution and homogenization.

On the other hand, it is known that reactions take place in marls, particularly if lime and hydraulic factors are sufficiently finely distributed, even at temperatures below those conventionally employed in the production of Portland cement clinker. Just to name an example, Roman (Parker's) lime which is obtained by burning marl of a certain composition (about 50 percent by weight CaO) was widely used 100 to 150 years ago. The very limited number of natural raw material deposits of suitable composition, the fairly complicated production and the fact that binders such as Roman (Parker's) lime have a great initial setting rate, but relatively modest final strengths, have relegated this binder to a part of minor importance.

It has been found by the inventors that mixtures of Portland cement clinker of conventional composition and clinker of low calcium (lime) content possess excellent hardening properties. Clinker of low calcium content or marl clinker is understood to mean a clinker burned from a raw material which contains essentially less calcium (lime) than conventional cement raw meal, with reactions between the individual components effected in the solid or melt state, particularly by means of fritting, sintering and/or partial melting. Suitable raw materials (starting materials) for such marl clinkers are, for example, natural raw materials such as tea green marl, calciferous clays, marl, lime marl, argillaceous limestones, dolomitic marls, shale, clay slate, phyllites, lime phyllites, ultramafic rocks as well as mixtures of two or more of the components mentioned above. Further to be mentioned are waste products which are similar in their composition to the marl clinker raw materials described. The chemical composition of the marl clinker raw materials can vary within a wide range. The marl clinker raw materials, just like conventional Portland cement raw meal, consist mainly of compounds comprising silicic acid, alumina, ferric oxide and lime, but containing less lime than conventional Portland cement raw meal.

The marl clinker thus contains hydratizable compounds which are lower in calcium (lime) content than Portland cement clinkers of conventional composition. Hydratisable is understood to mean that the components present in the marl clinker and formed by the burning process are capable of forming compounds by reacting with water, which compounds are then resistant to the attack of water, their hydraulicity susceptible to being stimulated or enhanced in a manner known per se by means of alkaline or sulfatic substances. The hydratisable substances differ by their inherent hydraulicity from substances such as certain $SiO_2$ modifications (opal) or kaoline whose structure is merely opened by heating and which are thus suitable for reacting with calcium hydroxide.

In the characterisation of the formation of new phases in the marl clinkers, it must be taken into consideration that these are highly susceptible to the formation of solid solutions (mixed crystals) whose composition is not as yet sufficiently understood. The fact that these phases are formed at least partially by means of solid state reactions is a contributing factor to their comparatively low crystallinic order, which enhances their hydraulicity, but hampers their identification.

In a number of printed publications, two- or multicomponent clinkers are described which are components of binders, particularly of cement.

U.S. Pat. No. 1,696,899 describes a mixture comprising the conventional Portland cement and acidic rocks such as, for instance, porphyrite, syenite, granulite, pegmatite, and the like. These acidic rocks are first dried and then very finely ground and mixed with the cement.

German Offenlegungsschrift No. 1,646,397 describes a cement consisting of two clinkers, i.e. of a Portland cement clinker of conventional composition and a clinker produced from inferior limestone of low $CaCO_3$ content and possibly increased MgO content. According to this publication, the inferior limestone is burned in the melt together with bauxite, the melted mass is then quenched in water as is done in processing blast furnace slag, to yield a vitreous material.

DL-PS 104 774 describes a process in which a raw material of conventional composition, but of increased MgO content, is provided with an addition of mineraliser facilitating the burning process.

GB-PS 447 722 describes a mixture containing, in addition to Portland cement of conventional composition, heated materials with a content of clay, lime and silicic acid. These materials are to contain a sufficient quantity of chemically active silicic acid after heating to bind the calcium hydroxide liberated in the hydration of the Portland cement clinker. The materials provided according to this publication in addition to the Portland cement clinker do not possess hydraulic setting properties of their own.

SUMMARY OF THE INVENTION

The object of the present invention is a cement comprising at least two clinkers of which one is a Portland cement clinker of conventional composition and the other is at least one clinker burned at temperatures within a range of up to 1200° C, wherein at least one porous marl clinker (malm clinker) opened at temperatures between 450° and 1250° C by means of a burning process and containing hydratizable mineral phases of low calcium content and 0 to 30 percent by weight related to said marl clinker of glass phases, i.e. vitreously solidified components, is contained in addition to said Portland cement clinker of conventional composition.

The Portland cement clinker present in the cement according to the invention is advantageously a clinker with a "Kuhl" lime standard of more than 90, particularly preferred of more than 96.

The cement according to the invention, comprising at least two clinkers of clearly different chemical composition, i.e. the marl clinker mentioned above and particularly described in the following and the conventional Portland cement clinker, has the following substantial advantages over a conventional cement which is unmixed.

Replacing part of the Portland cement clinker by marl clinker causes less calcium hydroxide being present in the hardened cement paste, due to the presence of clinker minerals of low calcium content, bringing about an increased final strength and improved resistance to chemical attacks.

What makes the novel cement interesting is not only its quality, but also the saving in energy, technical equipment and expense made possible by the low temperature requirement in burning the marl clinker portion.

A further advantage of the cement according to the invention consists in the fact that the content of 3 CaO.Al$_2$O$_3$ in the cement mixture, which must be low for some types of application, is lowered. This decreases the hazard of crack formation in the hardened concrete. It has further been found that cement according to the invention containing marl clinker yields a concrete of vastly improved workability. The cement according to the invention is thus particularly suitable for use as a starting material for plaster and masonry cement, mixed binder, ready-mixed mortar and similar products.

It was further found that the chemical composition of the marl clinker can vary within a comparatively wide range without detriment to the favorable hardening behavior of the cement according to the invention. An elaborate blending and homogenization of the raw materials such as it is at present indispensable for high grade Portland cement raw meal can generally be dispensed with or at least greatly reduced.

The marl clinker raw materials can be charged into the kiln in a very coarse state without generating inhomogeneities impairing the strength of the burned marl clinker. It has further been found that small amounts of free lime and magnesia present in the burned marl clinker, or even larger amounts of these two substances, will not have an expanding or decomposing effect, due to the specific reactive properties of the burned marl clinker. This makes it possible to use dolomitic marls with MgO contents substantially higher than those admissible up to now in the production of Portland cement.

Due to its low calcium carbonate content, the marl clinker requires less heat for burning than conventional Portland cement raw meal, the kiln capacity is thus increased.

Finally, the marl clinker is of better grinding properties than the Portland cement clinkers of conventional composition.

Depending upon the composition of the raw marl used, or on the desired properties of the cement according to the invention, the following embodiments are preferred:

It is of advantage when the marl clinker present in addition to the Portland cement clinker contains as said mineral phases and glass phases ternary compounds selected from the group consisting of gehlenite, melilite, akermanite, brownmillerite, 4 CaO.Al$_2$O$_3$.Fe$_2$O$_3$, anorthite, grossularite, diopside, monticellite, merwinite and spurrite.

Preferably, the content in ternary compounds of the group indicated amounts to 10 to 100 percent by weight in relation to the amount of marl clinker, particularly preferred is a content of 30 to 100 percent by weight, in particular of 50 to 100 percent by weight, of ternary compounds in relation to the amount of marl clinker.

The weight ratios of Portland cement clinker to marl clinker in the cement according to the invention preferably range between 25:1 to 1:1, particularly preferred is a range of 10:1 to 4:1.

Cements according to the invention having the above defined ratios of Portland cement clinker to marl clinker are of excellent workability.

According to a further embodiment, the marl clinker can contain said mineral phases and glass phases in the form of calcium silicates of low calcium content. The content in these calcium silicates advantageously amounts to 5 to 100 percent by weight, particularly 20 to 100 percent by weight, each in relation to the total amount of marl clinker.

According to a further embodiment, the marl clinker contains as the mineral phases and glass phases calcium aluminates of low calcium content. Preferred is a content in said calcium aluminates of low calcium content of 5 to 100 percent by weight, in particular of 15 to 100 percent by weight each in relation to the amount of marl clinker.

Further, the marl clinker can contain as said mineral phase, an anhydrite formed by the reaction of decarbonated calcium carbonate and sulfur compounds present in the marl clinker raw materials in the course of the burning process.

Said mineral phases of low calcium content and, optionally, said glass phases, can be present in the marl clinker individually, but also in groups of two, several or all of the components or compounds indicated above.

In all cases, the percentages of phases indicated above for said compounds or components are preferred. Further, the mixing ratio of Portland cement clinker to marl clinker can be varied within a wide range.

The weight ratios of Portland cement clinker to said porous marl clinker are in all cases advantageously kept within a range of 25:1 to 1:1, particularly within a range of 10:1 to 4:1 (each Portland cement clinker) to marl clinker).

Pursuant to the preceding statements on the composition of the marl clinker, the cement according to the invention preferably comprises a marl clinker containing as said mineral phases solid solutions (mixed crystals) of at least two components selected from the group consisting of said ternary compounds of low calcium content, said calcium silicates of low calcium content and said calcium aluminates of low calcium content. All the compounds of this group are of low calcium content as compared to the mineral phases of Portland cement clinker.

According to a further embodiment of the invention, the cement can contain a marl clinker as defined above in which said mineral phases and glass phases comprise at least one component made up of a multi-substance system formed by the participation of substances derived from the secondary components of the marl clinker raw materials, these substances being selected from the group consisting of alkaline compounds, sulfur compounds, iron compounds, fluor compounds and compounds promoting the reaction between lime and hydraulic factors.

According to an advantageous embodiment of the invention, the marl clinker contains a proportion of melt, said melt stemming from the burning process.

Further preferred is a cement according to the invention comprising at least one porous marl clinker opened by means of a burning process at temperatures between 450° and 1250° C and containing hydratizable mineral phases of low calcium content and 0 to 30 percent by weight of glass phases (vitreously solidified components) in relation to the amount of marl clinker and at least one conventional cement additive selected from the group consisting of blast furnace slag, trass, fly ash, natural pozzolana, artificial pozzolana, cement raw meal, rock flour, calcium sulfate, dihydrate gypsum, anhydrite, grinding adjuvant and air entraining agent.

As a rock flour, the cement preferably contains limestone rock flour in amounts of 5 to 15 percent by weight in relation to the amount of marl clinker. It has been found that this share of limestone promotes the hardening of the marl clinker.

It is particularly advantageous for the cement defined above to contain at least two clinkers and said cement additions and, as said hydratizable mineral phases of low lime content and said glass phases, 10 to 95 percent by weight of at least one ternary compound of low calcium content selected from the group consisting of gehlenite, melilite, akermanite, brownmillerite, 4 CaO·Al$_2$O$_3$·Fe$_2$O$_3$, anorthite, grossularite, diopside, monticellite, merwinite and spurrite and 5 to 90 percent by weight of calcium silicates of low calcium content.

Advantageous for the final strength are cements which in addition to the Portland cement clinker of conventional composition and to said conventional cement additions comprise at least one porous marl clinker containing as said mineral phases of low calcium content and glass phases 10 to 90 percent by weight of at least one ternary compound of low calcium content selected from the group consisting of gehlenite, melilite, akermanite, brownmillerite, 4 CaO.Al$_2$O$_3$.Fe$_2$O$_3$, anorthite, grossularite, diopside, monticellite, merwinite and spurrite, at least 5 to 85 percent by weight of calcium silicates of low calcium content and at least 5 to 85 percent by weight of calcium aluminates of low calcium content each in relation to the amount of marl clinker.

Said marl clinkers in the cements according to the invention preferably contain as said hydratizable mineral phases of low calcium content and glass phases at least one of said ternary compounds of low calcium content selected from the group consisting of gehlenite, melilite, akermanite, brownmillerite, 4 CaO.Al$_2$O$_3$.Fe$_2$O$_3$, anorthite, grossularite, diopside, monticellite, merwinite and spurrite and at least one component made up of a multi-substance system formed particularly by participation of compounds derived from the secondary components of the marl clinker raw materials, these compounds being selected from the group consisting of alkaline compounds, sulfur compounds, iron compounds, fluor compounds and compounds promoting the reaction between lime and hydraulic factors.

As already mentioned, the preferred weight ratios of Portland cement clinker to porous marl clinker (s) of 25:1 to 1:1 and the particularly preferred weight ratios of 10:1 to 4:1 are also applicable to those cements containing marl clinkers comprising more than one of the above mentioned phases and components and said conventional cement additives.

It was found that by application of the cements of the above defined compositions, weight ratios and conditions, the concretes prepared show strength and workability not only comparable to the strength and workability achieved with Portland cments of conventional composition, but even exceeding this.

If the influence of the marl clinkers is to be enhanced, such as it would be the case in plaster and masonry cement, this can be achieved by increasing the portion of marl clinker.

The reaction rate of the marl clinker can be increased by carrying out the burning at the lowest possible temperatures, by adding fluxes such as sulfides, fluorides, alkaline substances, substances rich in magnesia, rotary kiln flue dust or the like to the raw meal or by cooling the burned marl clinker at the fastest possible rate. Of course it is also possible to combine the measures enhancing the reactivity.

It was further found that it is of advantage to use a cement containing a marl clinker which has been opened, but contains 30 percent by weight at the most, preferably 10 percent by weight, particularly less than 5 percent by weight of melt, this melt stemming from the burning process.

A particularly high reaction rate is observed in those cements according to the invention which comprise a marl clinker obtained by burning in the solid state and not containing any melt at all.

The cements according to the present invention can be obtained by separately grinding the two clinkers, optionally together with at least one of the additions and adjuvants indicated above, and then mixing them in the ground state, optionally with further additions and adjuvants, or by grinding these clinkers together, optionally with at least one of the additions and adjuvants enumerated above.

Which means that the Portland cement clinker of conventional composition can be burned separately and then mixed or ground with the marl clinker(s) disclosed above which were also burned separately and thus brought to the temperatures indicated above.

It is known that temperatures within a range exceeding 1300° C are required for burning raw meal to Portland cement clinker, and that the heat generated in the clinker by the burning process must be removed when the clinker leaves the kiln's burning zone. The kiln is generally a rotary kiln and the heat is removed by means of the clinker cooler which can have the form of e.g. a grate-, planetary-, rotary or shaft cooler. As a rule, part of the removed heat is utilised for heating the air supplied to the kiln. There is no possibility to utilise the remainder of the heat. This also applies to the burning process to which the starting materials for the marl clinker portion are subjected.

It was thus the object of the invention, achieved by extensive research work, to avoid these disadvantages and to provide a process for the production of the new cement disclosed above by combining the product streams of the different clinkers and thus not only streamlining the process itself, but making the production process, which had been separate for the two types of clinkers in the past, much more economical.

A further object of the invention is thus a process for producing the novel cement disclosed above allowing, on the one hand, a very effective utilization of the heat energy generated in the course of the burning process and thus a lowering of the energy costs steadily raising prices in the cement industry and, on the other hand, an essentially streamlined process as compared to the known methods as well as an alleviation of the problem of waste heat.

The process for the production of the novel cement is characterized by the improvement comprising the steps of burning Portland cement raw meal in a burning process in order to obtain Portland cement clinker, adding, under utilization of the heat generated in burning the Portland cement clinker portion or of the heat liberated in the subsequent cooling of the hot clinker, respectively, at least one of the raw materials required for the burning of the marl clinkers described in detail above, these raw materials being selected from the group consisting of tea green marls, calciferous clays, clay slates, shales, argillaceous limestone rocks, marls, phyllites, lime phyllites, lime marls, ultramafic rocks, dolomites, marl slates and waste products which are similar in their composition to the marl clinker raw materials disclosed, to the hot Portland cement clinker of conventional composition, after it had passed the maximum temperatures, within the cooling zone, said raw materials being heated to the desired temperatures of 450° to 1250° C as a result of the direct contact with the hot Portland cement clinker, and subsequently cooling off both clinkers.

It is particularly preferred to heat the marl clinker raw materials to temperatures of 700° to 1100° C by means of the hot Portland cement clinker.

The "cooling zone of the process" mentioned above is that zone of the kiln where the Portland cement clinker has just passed the maximum temperature imparted to it during the burning process, it extends over a transition zone from the kiln, which is particularly a rotary kiln, to the clinker cooler and within this cooler up to the end of the cooling process.

By means of the process according to the invention, which provides for the addition of the marl clinker raw materials to the hot Portland cement clinker, an intensive and dense contact of the product streams and thus a very effective transfer of the heat energy generated in the Portland cement clinker by the burning process and stored in there to the marl clinker raw materials which are generally charged in a cold state is achieved. As desired, the freshly burned Portland cement clinker is cooled off quickly due to its contact with the cold marl clinker raw materials and the marl clinker raw materials themselves are heated to the desired burning temperature and thus converted to the marl clinker portion described in detail above. By the fast transfer of heat from the hot Portland cement clinker to the cold marl clinker raw material, the quality of the Portland cement clinker is improved, on the one hand, while, on the other hand, the surface of the marl clinker raw material particles is heated particularly fast and intensively, which creates a denser and stronger structure and increased abrasive strength, while the inside of the particles, which was heated more slowly and to lower temperatures due to the limited amount of heat available, is essentially more porous and thus of increased reactivity.

The addition of the marl clinker raw material to the hot Portland cement clinker provided for according to the present invention considerably lowers the thermal wear of the clinker cooler or the kiln outlet which is conventionally exposed to kiln outlet temperatures of the Portland cement clinker of about 1300° C, at the same time, it markedly enhances its cooling effect.

The application of the joint working process also eliminates part of the grinding and blending processes which were necessary in the formerly used, separate burning processes.

To the combined cement clinker thus obtained, at least one of the conventional cement additions selected from the group consisting of blast furnace slag, trass, fly ash, natural pozzolana, artificial pozzolana, cement raw meal, rock flour, calcium sulfate, dihydrate gypsum, anhydrite, grinding adjuvant and air entraining agent is added in order to obtain a cement of the desired properties.

The addition of the marl clinker raw materials within the range of the cooling zone defined above can be effected in any given manner, as explained in detail later on.

In the production of the cement according to the invention, it is not only possible, but even preferable to add the marl clinker raw materials of the group indicated to the hot Portland cement clinker in a coarse state, i.e. particle sizes of 5 to 100 mm, preferably of 10 to 30 mm, without causing the formation of inhomogeneities in the burned marl clinker which might be detrimental to its quality.

The ratio of marl clinker raw materials added to the hot Portland cement clinker can vary within a wide range, on the one hand, depending upon the marl clinker portion desired for reasons of quality in the cement and, on the other hand, on the temperatures to which the marl clinker raw materials are to be heated. If the burning temperature is to be high, such as in the range of 800° to 1100° C, less marl clinker raw materials are added or additional heat is supplied; if the temperatures are to be kept lower, within a range of 500 to 800° C, the amount of marl clinker raw material can be increased. A regulation of the burning temperature of the marl clinker raw materials at certain or predetermined charges can also be achieved by selection of the place of the charge. For instance, if a low burning temperature is desired for the marl clinker raw materials, they are added immediately downstream of the clinker flow into the cooler or directly into the cooler. A weight ratio of marl clinker raw materials ((here indicated as burned (finished) marl clinker)) to Portland cement clinker of conventional composition of 1:1 up to 1:25 is generally applied. Particularly favourable results, especially in respect to economy and simultaneous achievement of high strengths of the concretes produced from these cements later on, are obtained at weight ratios of 1:4 to 1:10 of marl clinker to Portland cement clinker of conventional composition. The cements thus obtained are very similar to Portland cements, but even superior in the workability of the concrete produced from them and in other properties of the concrete product.

It is of advantage to carry out the process in such a manner that the marl clinker portion consists of a marl clinker which has been opened by burning, but contains only a proportion, up to 30 percent by weight, preferably 10 percent by weight at the most, particularly preferred of less than 5 percent by weight, of melt (each in relation to the marl clinker) and is thus of a porous structure.

A particularly high reactivity of the marl clinker is achieved when the process is carried out in such a manner that the marl clinker portion consists of a marl clinker which has been burned in the solid state and contains no melt at all.

The addition of the raw materials for the marl clinker to the range of the cooling zone of the process can be effected at the discharge end of the kiln, into the transition zone between kiln and cooler or into the clinker cooler itself and in any given manner.

The device for performing the process comprises a burning kiln, in particular a rotary kiln, for burning Portland cement clinker of conventional composition, and a cooling means formed by a clinker cooler, wherein a feeding means for the marl clinker raw materials is provided, the discharge end of said feeding means being arranged within the area of the cooling zone of the process. The cooling zone of the process is precisely defined above. Preferably, a transition means is arranged between the discharge end of the rotary kiln and said cooling means.

The discharge end of the feeding means can be arranged within that area of the cooling zone which is still within the kiln, i.e. within the area of the discharge end of the kiln.

In this embodiment, which is particularly suitable when the marl clinker raw materials have to be heated to comparatively high temperatures or when large amounts are added, the hot Portland cement clinker and the marl clinker raw materials are already intimately mixed within the kiln discharge zone due to the rotation of the kiln.

The discharge end of the feeding means for the addition of the marl clinker raw materials can also be arranged directly within the transition means mentioned above.

The hot Portland cement clinker passing the transition means, due to its movement, comes into intimate contact with the added marl clinker raw materials.

But is is also possible, where only moderate heating of the raw materials is desired, in particular, to arrange the discharge end of the feeding means within the clinker cooler itself.

It is further possible to charge the marl clinker raw materials by means of more than one feeding means each positioned in the areas indicated.

It is of advantage to use a conveyor screw as the feeding means. A feeding means particularly simple of construction and easy to operate comprises a stationary conveying organ. This can have the form of a simple chute, of an inlet pipe (gravity tube) of any given cross section, of a slide or of a gutter. A further possibility consists in the provision of a feeding means in the form of a shovel-type installation which is arranged on the kiln shell of the discharge end of the rotary kiln or on the shell of a rotary cooler, penetrating the shell and leading into the interior of the cooler or of the kiln.

If, for instance, a chute is used for conveying the marl clinker raw materials, for example, to the area of the discharge end of the kiln, an intimate mixing of the hot Portland cement clinker and the marl clinker is achieved still within the area of the discharge end of the kiln due to the rotation of the kiln.

Further preferred is a device according to one of the embodiments disclosed above, characterised in that the feeding means for the addition of the marl clinker raw materials is connected, via at least one interposed sealing means, to the transition means arranged between kiln and cooling means.

As a sealing means particularly suitable for permitting the gas-tight charging of the raw materials into the respective area of the kiln, it is preferred to use double pendulum flap valves or cellular wheel sluices (rotary dischargers).

If the rotary kiln is provided with planetary coolers, the feeding means or the discharge end of the feeding means advantageously extends into the area of the feed openings from the rotary kiln, so that the addition of the marl clinker raw materials occurs in the transition area from the kiln to the cooler.

Particularly preferred is a device formed of at least one coil or screw wing built into the inside of the shell of the rotary kiln and rotating together with the kiln shell. This coil or screw wing conveys the marl clinker raw materials which are charged at the discharge end of the kiln to the feed openings from the rotary kiln to the planetary coolers. In the event that several coils or screw wings are used, their discharge ends can be so arranged that each coil or screw wing conveys the marl clinker raw materials to one particular feed opening of the planetary coolers. This is of advantage particularly in those cases where a comparatively small amount of marl clinker is to be burned and the raw materials are not to be heated to very high temperatures.

In order to secure the proper conveying of the marl clinker raw materials, the discharge end of the rotary kiln can be conically shaped and thus the kiln shell be of an inclination compensating for the slant of the rotary kiln, this opposed inclination conveying the marl clinker raw material charged at the discharge end of the kiln to the feed openings of the planetary coolers.

Particularly preferred, especially in view of the adjustment of the amount of marl clinker raw materials added and thus of the regulation of the temperature to which these materials are heated, is a device provided with a feeding means for the addition of the marl clinker raw materials which is connected to the kiln or the transition means via at least one interposed metering means, such as, for instance, a belt weigher.

DESCRIPTION OF THE DRAWINGS

The invention is described in detail with reference to the accompanying drawings showing non-limiting embodiments of the devices according to the invention for carrying out the process of the present invention.

Modifications and variations are possible within the scope of the claims and without deviating from the spirit of the invention.

In the drawings,

FIG. 1 is the diagrammatic view of a rotary kiln plant for carrying out the process according to the invention, with the places mainly serving for the addition of the marl clinker raw materials being particularly marked:

Figure 1:
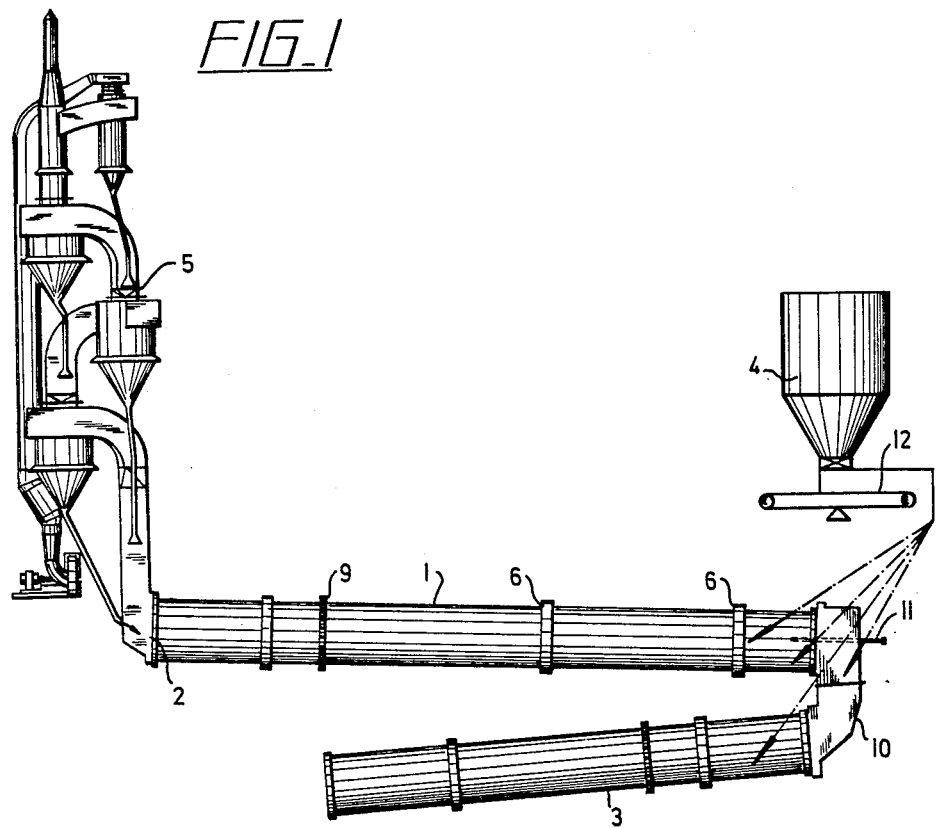
Figure 2:
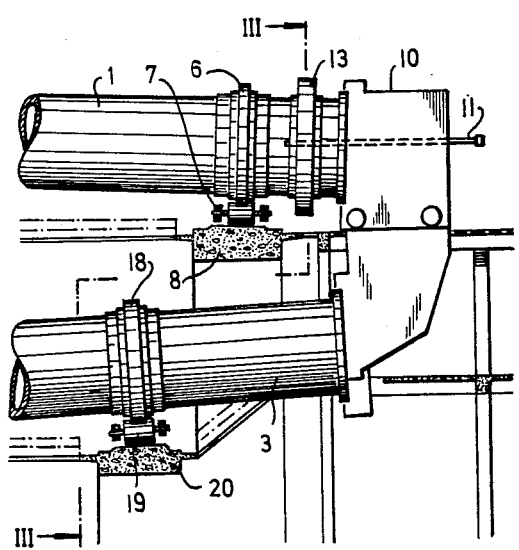
Figure 3:
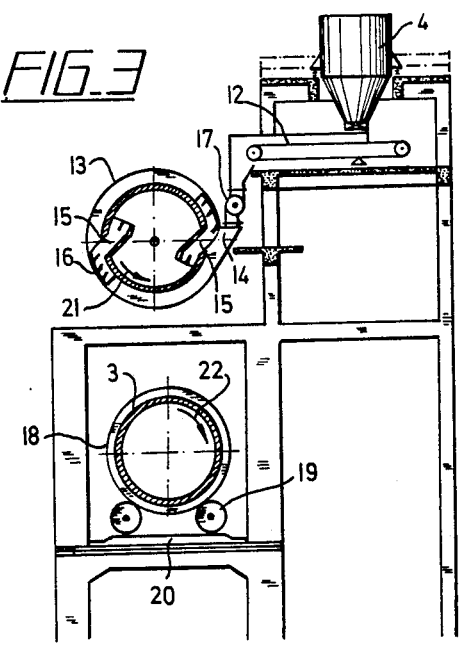
Figure 11:
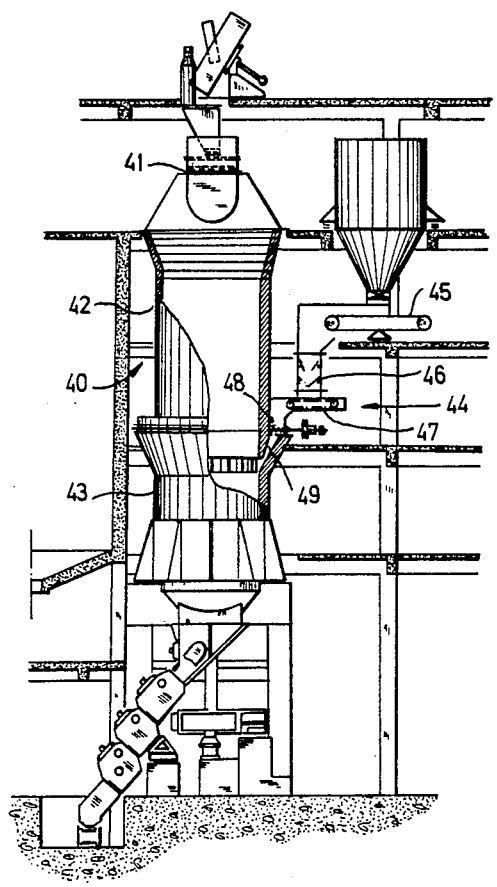

FIG. 2 an enlarged view of the discharge end of a rotary kiln in which the marl clinker raw materials are charged directly into the rotating part of the rotary kiln within the area of its discharge end, FIG. 3 a section along line III—III in FIG. 2, FIG. 4 a view enlarged in comparison to FIG. 1 of the discharge end of a rotary kiln in which the marl clinker raw materials are charged into the transition means between the rotary kiln and the cooling means, FIG. 5 a section along line V—V in FIG. 4, FIG. 6 a view enlarged in comparison to FIG. 1 of the discharge end of a rotary kiln in which the marl clinker raw materials are charged into the rotating part of the cooling means arranged downstream from the rotary kiln, FIG. 7 a section along line VII—VII in FIG. 6, FIG. 8 a partly sectional view enlarged in comparison to FIG. 1 of the discharge end of a rotary kiln in which the marl clinker raw materials are charged by means of a gravity tube or a chute directly into the rotating kiln, FIG. 9 a section along line IX—IX in FIG. 8, FIG. 10 a section enlarged in comparison to FIG. 1 through the discharge end of a rotary kiln provided with planetary coolers in which the marl clinker raw materials are charged within the area of the feed openings to the planetary coolers, and FIG. 11 a partly sectional, diagrammatic view of a shaft kiln plant for carrying out the process according to the invention.

DETAILED DESCRIPTION OF THE PREFERRED EMBODIMENTS

Identical reference numbers are used for the corresponding parts in the figures.

The rotary kiln plant for carrying out the process of the invention shown in FIG. 1 essentially comprises the rotary kiln 1 proper, a charging means 2 for the kiln charge, a cooling means 3 for the burned material arranged downstream from the rotary kiln, a feeding means 4 for the addition of the marl clinker raw material and a heat exchanger plant 5 for heating the cement raw meal by means of the hot kiln exhaust gases. The type of heat exchanger shown in FIG. 1 can of course be replaced by a Lepol grate preheater or by an extension of the rotary kiln by means of a calcining and drying zone.

The rotary kiln 1 is arranged in a manner known per se with a slight horizontal inclination and provided with riding rings 6 supported via rollers 7 in bearings 8 (FIG. 2, 4, 6, 8). The rotary kiln is driven by means of a motor and gear not shown in detail, the motor driving a gear rim 9 which is in torsion-tight connection with the rotary kiln.

To the rotary kiln 1, the cooling means 3 for the burned material is connected via an interposed transition means 10. The transition means 10 at the same time serves as a support for the burner 11 for the rotary kiln 1 and forms a gravity shaft through which the burned material discharged from the rotary kiln 1 is conveyed to the cooling means 3. The cooling means 3 can optionally comprise a rotary cooler (FIGS. 2 to 7,) a grate cooler (FIGS. 8, 9), a shaft cooler or a planetary cooler (FIG. 10). If a rotary cooler is used, it is driven by means of a motor (not shown).

Within the area of the cooling zone of the process, marl clinker raw material is charged by means of the feeding means 4. Just as shown in FIG. 1 with broken lines, the feeding inlet can optionally be arranged in the discharge end zone of the rotary kiln itself, (FIGS. 2, 3 and 8, 9), in the transition means (FIGS. 4, 5), in the feed end zone of the cooling means (FIGS. 6, 7), or in a conically shaped discharge end of the rotary kiln (FIG. 10). The connection of the feeding means 4 to the cooling zone of the process is preferably effected via an interposed metering means 12. The metering means 12 can comprise a belt weigher, for instance.

In the embodiment according to FIGS. 2 and 3, the feeding inlet for the marl clinker raw materials is arranged, as already mentioned, immediately within the discharge end zone of the rotary kiln 1. The feeding means 4 and the metering means 12 are arranged laterally and spacially above the discharge end zone of the rotary kiln 1 which is surrounded on a short part of its length by a hood 13 with tangential inlet opening 14. The rotary kiln 1 is provided in the area within the hood 13 with two diametrically opposed openings 15 to which are connected shovel-shaped mountings 16 projecting into the hood 13 and extending into the interior of the rotary kiln and rotating together with the rotary kiln 1. The inlet opening 14 of the hood 13 is connected to the discharge side of the metering means 12 via an interposed locking and/or sealing organ 17 in the form of a cellular wheel sluice.

The cooling means 3 in the form of a rotary cooler is provided in a manner similar to that of the rotary kiln 1 with a riding ring 18 supported via rollers 19 on a bearing 20 (FIGS. 2 to 7). The rotating direction of the rotary kiln 1 is indicated by means of arrow 21 and the rotating direction of the rotary cooler 3 is indicated by means of arrow 22.

In the embodiment according to FIGS. 2 and 3, the marl clinker raw material charged by the feeding means 4 is thus passed into the hood 13 via the metering means 12, the locking and/or sealing organ 17 and the tangential inlet opening in the hood 13, it is taken up by the shovel-shaped mountings 16 and conveyed through openings 15 to the interior of the rotary kiln 1 where it comes into contact with the hot Portland cement clinker of conventional composition.

In the embodiment according to FIGS. 4 and 5, the feeding means 4 for the addition of the marl clinker raw materials comprises a conveyor screw 23 whose discharge end, as already mentioned, empties into the transition means 10 between the rotary kiln 1 and the cooling means 3 again having the form of a rotary cooler. The conveyor screw 23 has the form of a socalled damming screw, i.e. the marl clinker raw material charged is dammed up and forms a plug serving as an air-tight seal in the zone of the discharge end of the screw 23. The feeding hopper of the screw 23 bears the reference number 25. The flow of material again passes via the metering device 12 in the form of a belt weigher to the charging end of the screw 23 driven by a gear motor 24 and is conveyed by means of the screw 23 to the transition means 10. The screw 23 is arranged in a plane essentially transverse to the axis of rotation of the rotary kiln 1, so that the marl clinker raw materials are charge directly into the material dropping from the discharge end of the rotary kiln 1.

In the embodiment according to FIGS. 6 and 7, the charging orifice for the marl clinker raw material is arranged on the intake end of the rotary cooler 3 and is formed essentially as shown in FIGS. 2 and 3. The feeding means 4 and the metering means 12 are arranged laterally and spacially next to the rotary cooler 3 which is surrounded on a short part of its length by a hood 26 with tangential intake opening 27. The rotary cooler 3 is provided within the area inside of its hood 26 with two diametrically opposed openings 28 connected to which are shovel-shaped mountings 29 projecting into the hood 26, extending into the interior of the rotary cooler 3 and rotating together with the rotary cooler. The intake opening 27, whose axis is directed essentially vertically upwards, is connected via an interposed sealing means 30 in the form of a double pendulum sluice with the discharge end of the metering means 12. The double pendulum sluice or flap valve comprises two spacially arranged sealing systems one of which is always open and the other one closed, so that in each operation, only the material present at that time between the two sealing systems can pass into the tangential intake opening 27 of the hood 26. The marl clinker raw material charged by the feeding means 4 is thus charged via the metering means 12 and the sealing means 30 into the tangential intake opening 27 of the hood 26, taken up by the shovel-shaped mountings 29 circulating in the direction of the arrow 22 in the hood 26 and passed into the rotary cooler 3 in the course of the cycling motion.

In the embodiment according to FIGS. 8 and 9, the feeding means 4 for the addition of the marl clinker raw materials comprises a stationary conveying organ 31 whose discharge end protrudes directly into the discharge end of the rotary kiln 1. The stationary conveying organ 31 can be embodied so that its discharge end is movable in the direction of the axis of the kiln. The conveying organ 31 can comprise a gravity tube, a chute or any other type of slide or gutter vertically or obliquely positioned. The flow of material passes from the feeding means 4 via the metering means 12 and a sealing means 32 which can again have the form a a double pendulum sluice according to FIGS. 6 and 7, onto the stationary conveying organ 31 which conveys the marl clinker raw materials directly into the discharge end of the rotary kiln 1. In this, the stationary conveying organ 31 penetrates the wall of the transition means 10 and extends in a plane positioned off-center of the axis of rotation of the rotary kiln 1 in order to permit the burner 11 for the rotary kiln 1 to be arranged in the axis of rotation of same. The cooling means 3 adjacent the transition means 10 in this embodiment has the form of a grate cooler.

In the embodiment according to FIG. 10, the marl clinker raw material is charged by means of the feeding means 4 via the metering means 12 and via a conveying screw 33 into the conically shaped discharge end 34 of the rotary kiln 1. The cooling means 3 downstream from the rotary kiln 1 in this has the form of a planetary cooler, the individual planets spacially arranged on the periphery of the discharge end of the rotary kiln 1 and thus orbiting together with this bear the reference number 35. The orifices for passing the burned material from the rotary kiln 1 to the individual planetary coolers 35 bear the reference number 36. The conically shaped end part 34 of the rotary kiln 1 can be provided with several coils or screw wings 37 which convey the marl clinker raw materials each to one particular orifice 36 for passing the burned material. The burner 11 for the rotary kiln 1 is again arranged in the axis of rotation of the rotary kiln, while the screw 33 is arranged parallel to this axis of rotation.

The screw 33 is driven by means of a motor 38. A shield 39 pierced by the screw 33 is provided as protection from the radiation heat and against injuries of the operating personnel by the rotating planetary coolers. In this embodiment, the marl clinker raw materials charged by the feeding means 4 via the screw 33 and the coils 37 are conveyed to the passing orifices 36 to the planetary coolers 35 and there brought into contact with the hot Portland cement clinker of conventional composition discharged from the rotary kiln 1.

In the embodiment according to FIG. 11, the burning kiln is a shaft kiln 40 comprising a charging means 41 for the Portland cement raw meal of conventional composition, a burning zone 42 and a cooling zone 43. In the transition area between the burning zone 42 and the cooling zone 43, a feeding means 44 comprising a metering means 45 in the form of a belt weigher, a double pendulum sluice 46, a conveying organ 47 and a rotating disk 48 charging the marl clinker raw materials through an opening 49 in the wall of the shaft kiln 40 into the latter is provided. The marl clinker raw materials are then brought into contact with the hot Portland cement clinker of conventional composition inside of the shaft kiln.

The devices shown in the individual figures can also be combined or exchanged among one another.

The cements according to the present invention and the production of these cements are explained in detail by means of the following Examples, which are also of a non-limiting nature.

EXAMPLE 1

Various marl clinker raw materials of Compositions A to E (Table 1) were crushed to various degrees of fineness and burned in muffle furnaces or in a rotary kiln at temperatures between 500° and 1200° C. The compositions of the marl clinkers thus obtained are indicated in Table 2. The marl clinker was then ground together with Portland cement clinker of conventional composition and crude gypsum rock in varying amount ratios. The resulting cement mixtures were then tested according to Austrian Cement Standard ON B 3310. The results are indicated in Table 2.

Table 1:

| Marl Clinker Raw Materials | A | B | C | D+) | E++) |
|---|---|---|---|---|---|
| Analysis of the raw material in the unburned state (percent by weight) | | | | | |
| ignition loss | 20 | 20 | 25 | 22 | 19 |
| $SiO_2$ | 34.3 | 34.3 | 17.5 | 20.1 | 23.1 |
| $Al_2O_3$ | 13.0 | 13.0 | 8.4 | 13.5 | 10.3 |
| $Fe_2O_3$ | 5.8 | 5.8 | 2.9 | 3.0 | 3.4 |
| CaO | 18.7 | 18.7 | 42.0 | 37.8 | 32.0 |

Table 1: -continued

| Marl Clinker Raw Materials | A | B | C | D[+] | E[++] |
|---|---|---|---|---|---|
| MgO | 4.5 | 4.5 | 2.9 | undet. | 8.4 |
| Fineness (percent by weight) | | | | | |
| 10 - 25 mm | 0 | 40 | 0 | 0 | 0 |
| 1 - 10 mm | 0 | 30 | 0 | 0 | 0 |
| 0.2 - 1 mm | 0 | 30 | 0 | 0 | 60 |
| <0.2 mm | 100 | | 100 | 100 | 40 |

[+] mixture of an argillaceous marl with a calciferous marl at ratio 2 : 1
[++] lime phyllite

Table 2:

| Marl Clinker | A | | | B | | | |
|---|---|---|---|---|---|---|---|
| Burning Temperature | — | 800° C | | — | 600° C | 1000° C | 1200° C |
| Duration of burning | | 2 h | | | 2 h | 2 h | 2 h |
| Chemical composition in percent by weight | | | | | | | |
| $CO_2$ | | 6,3 | | | 11,2 | 1,0 | 0,2 |
| free CaO | | 0,4 | | | 0,1 | 2,5 | 0,0 |
| New Phases detected in marl clinker[+] (main phases | | Me | | | Me | Me $C_4AF$ | Me $C_4AF$ CS $CAS_2$ |
| Cement consisting of: | | | | | | | |
| Portland cement clinker of conventional composition % | 94 | 79 | 64 | 94 | 79 | 79 | 79 |
| Marl Clinker % | — | 15 | 30 | — | 15 | 15 | 15 |
| Crude Gypsum Rock % | 6 | 6 | 6 | 6 | 6 | 6 | 6 |
| Normal Consistence, % | 27,5 | 29,0 | 29,5 | 27,5 | 30,0 | 27,5 | 27,0 |
| Begin of Setting, h/min | 2/50 | 2/30 | 2/25 | 2/50 | 2/25 | 2/25 | 2/10 |
| End of Setting, h/min | 3/30 | 3/10 | 3/05 | 3/30 | 3/05 | 3/00 | 2/55 |
| Soundness Test | passed | passed | passed | passed | passed | passed | passed |
| Flow in cm | 21,8 | 20,0 | 19,0 | 21,8 | 19,7 | 21,5 | 21,2 |
| Flexural Strength, kp/cm² | | | | | | | |
| after 3 days | 55 | 48 | 42 | 55 | 51 | 49 | 47 |
| after 7 days | 64 | 62 | 56 | 64 | 64 | 62 | 60 |
| after 28 days | 72 | 73 | 71 | 72 | 73 | 73 | 72 |
| Compressive Strength, kp/cm² | | | | | | | |
| after 3 days | 252 | 230 | 182 | 252 | 230 | 215 | 211 |
| after 7 days | 320 | 321 | 260 | 320 | 315 | 308 | 300 |
| after 28 days | 401 | 418 | 387 | 401 | 395 | 405 | 388 |

| Marl Clinker | C | | | D | | | |
|---|---|---|---|---|---|---|---|
| Burning Temperature | — | 500° C | 900° C | — | | 900° C | |
| Duration of burning | | 2 h | 2 h | | | rotary kiln | |
| Chemical composition in percent by weight | | | | | | | |
| $CO_2$ | | 18,3 | 6,5 | | | 2,3 | |
| free CaO | | 0,5 | 5,0 | | | 6,5 | |
| New Phases detected in marl clinker[+] | | Ge | Ge $C_2S$ $C_4AF$ $CaSO_4$ | | | Ge $C_4AF$ CA $C_2S$ | |
| (main phases | | | | | | | |
| Cement consisting of: | | | | | | | |
| Portland cement clinker of conventional composition % | 94 | 79 | 79 | 95 | 82 | 65 | 47,5 |
| Marl Clinker % | — | 15 | 15 | — | 13 | 30 | 47,5 |
| Crude Gypsum Rock % | 6 | 6 | 6 | 5 | 5 | 5 | 5 |
| Normal Consistence, % | 27,5 | 28 | 28 | 28,0 | 28,5 | 30,0 | 35,0 |
| Begin of Setting, h/min | 2/50 | 2/00 | 2/10 | 3/10 | 3/25 | 1/25 | 0/25 |
| End of Setting, h/min | 3/30 | 3/00 | 2/40 | 4/00 | 4/30 | 2/10 | 0/45 |
| Soundness Test | passed | passed | passed | passed | passed | passed | passed |
| Flow in cm | 21,8 | 21,7 | 21,2 | — | — | — | — |
| Flexural Strength, kp/cm² | | | | | | | |
| after 3 days | 55 | 53 | 52 | 53 | 50 | 48 | 30 |
| after 7 days | 64 | 65 | 63 | — | — | — | — |
| after 28 days | 72 | 70 | 75 | 73 | 76 | 67 | 60 |
| Compressive Strength, kp/cm² | | | | | | | |
| after 3 days | 252 | 230 | 231 | 245 | 239 | 215 | 121 |
| after 7 days | 320 | 302 | 325 | — | — | — | — |
| after 28 days | 401 | 376 | 444 | 435 | 468 | 383 | 334 |

| Marl Clinker | E | |
|---|---|---|
| Burning Temperature | 1000° C | |
| Duration of burning | rotary kiln | |
| Chemical composition in percent by weight | | |
| $CO_2$ | 4,9 | |
| free CaO | 7,2 | |
| New Phases detected in marl clinker[+] (main phases | Me $C_2S$ | |
| Cement consisting of: | | |
| Portland cement clinker of conventional composition % | 94 | 77 |
| Marl Clinker % | — | 17 |

Table 2:-continued

| | | |
|---|---|---|
| Crude Gypsum Rock % | 6 | 6 |
| Normal Consistency, % | 27,5 | 27,5 |
| Begin of Setting, h/min | 2/50 | 3/00 |
| End of Setting, h/min | 3/30 | 3/35 |
| Soundness Test | passed | passed |
| Flow in cm | 21,8 | 20,2 |
| Flexural Strength, kp/cm$^2$ | | |
| after 3 days | 55 | 50 |
| after 7 days | — | — |
| after 28 days | 72 | 69 |
| Compressive Strength, kp/cm$^2$ | | |
| after 3 days | 252 | 216 |
| after 7 days | — | — |
| after 28 days | 401 | 379 |

+)Me = melilite
Ge = gehlenite
C$_4$AF = brownmillerite (solid solution series from 2 CaO . Fe$_2$O$_3$ to 6 CaO . 2Al$_2$O$_3$ . Fe$_2$O$_3$)
C$_2$S = 2 CaO . SiO$_2$
CA = CaO . Al$_2$O$_3$
CS = CaO . SiO$_2$
CAS$_2$ = CaO . Al$_2$O$_3$ . 2 SiO$_2$

EXAMPLE 2

In an oil-fired rotary kiln with a capacity of 460 t/day, a Portland cement clinker of the composition 56.9% C$_3$S, 15.3% C$_2$S, 14.0% C$_3$A and 8.2% C$_4$AF was burned. Via an opening in the kiln hood, at the level of the operating platform, marl clinker raw material with a particle size of 12 to 32 mm was charged onto the intake chute to the rotary cooler. (Composition: ignition loss 24.3%, SiO$_2$ 31.3%, Al$_2$O$_3$ 10.8%, Fe$_2$O$_3$ 4.5%, CaO 49.8%). There it mixed with the hot Portland cement clinker discharged from the kiln. The charge of marl clinker raw material amounted to 5900 kg/h, so that a weight ratio of Portland cement clinker of conventional composition to marl clinker of about 80 : 20 resulted. The clinker thus obtained and a control sample of Portland cement clinker free of marl clinker were ground in a cement tube mill (capacity 55 t/h) with a mixture of crude gypsum rock/anhydrite and then tested according to Austrian Cement Standard ON B 3310, with the following results:

| | Unmixed Portland Cement Clinker | Mixture of Portland Cement Clinker and Marl Clinker |
|---|---|---|
| Normal Consistency in % | 25.5 % | 26.0 % |
| Begin of Setting | 3 h 35 | 3 h 45 |
| End of Setting | 4 h 00 | 4 h 20 |
| Soundness Test | passed | passed |
| Flexural Strength | | |
| after 3 days | 46 kp/cm$^2$ | 43 kp/cm$^2$ |
| after 7 days | 53 kp/cm$^2$ | 52 kp/cm$^2$ |
| after 28 days | 67 kp/cm$^2$ | 72 kp/cm$^2$ |
| Compressive Strength | | |
| after 3 days | 216 kp/cm$^2$ | 223 kp/cm$^2$ |
| after 7 days | 275 kp/cm$^2$ | 272 kp/cm$^2$ |
| after 28 days | 387 kp/cm$^2$ | 411 kp/cm$^2$ |

Comparative, simultaneously effected concreting tests showed essentially improved workability in the concrete prepared from the cement with marl clinker content.

EXAMPLE 3

In an oil-fired rotary kiln with a capacity of 1050 t/day, a Portland cement clinker of the composition 68.2% C$_3$S, 9.8% C$_2$S, 9.9% C$_3$A and 7.4% C$_4$AF was burned. By means of a water-cooled pipe, marl with a particle size of 18 to 40 mm and the composition 21.4% ignition loss, 42.0% SiO$_2$, 19.6% Al$_2$O$_3$, 5.8% Fe$_2$O$_3$ and 25.1% CaO was charged into a zone about 1 m from the kiln discharge end directly into the rotary kiln where it admixed with the hot clinker. The mixture then dropped onto the grate of a grate cooler and cooled off there. The amount of marl clinker charged into the kiln was 6700 kg/h, so that a weight ratio of Portland cement clinker of conventional composition to mark clinker of about 88 : 12 resulted. The clinker mixture thus obtained and a control sample of Portland cement clinker/free of marl clinker were tested, after grinding with crude gypsum rock in a cement tube mill with a capacity of 43 t/h, (closed circuit mill) according to Austrian Cement Standard ON B 3310, with the following results:

| | Unmixed Portland Cement Clinker | Mixture of Portland Cement Clinker and Marl Clinker |
|---|---|---|
| Normal Consistence in % | 27.0 | 28.0 |
| Begin of Setting h/min | 2/25 | 1/45 |
| End of Setting h/min | 3/05 | 2/25 |
| Soundness Test | passed | passed |
| Flow in cm | 20.0 | 20.1 |
| Flexural Strength kp/cm$^2$ | | |
| 1 day | 47 | 45 |
| 3 days | 56 | 53 |
| 7 days | 65 | 66 |
| 28 days | 73 | 75 |
| Compressive Strength kp/cm$^2$ | | |
| 1 day | 186 | 203 |
| 3 days | 278 | 288 |
| 7 days | 356 | 364 |
| 28 days | 479 | 488 |

EXAMPLE 4

In a gas-fired rotary kiln with a capacity of 660 t/day, provided with planetary coolers, marl of the composition 25.7% ignition loss, 28.4% SiO$_2$, 15.5% Al$_2$O$_3$, 9.4% Fe$_2$O$_3$ und 43.1% CaO and a particle size of 3 to 10 mm was charged into the part of the kiln adjacent the planetary coolers by means of a screw. Due to the conical shape of this part of the kiln, the marl clinker raw material was conveyed to the inlet openings of the planetary coolers where it mixed with the hot clinker discharged from the kiln and entered the cooler together with the hot clinker. By the transfer of heat from the hot Portland cement clinker to the marl clinker raw material, an essential lowering of the temperature in the cooler was achieved. The amount added was so selected that a ratio of Portland cement clinker of conventional composition to marl clinker of 85:15 resulted. The clinker thus obtained and a control sample of Portland cement clinker free of marl clinker were ground under addition of 15% blast furnace slag with a mixture of crude gypsum rock/anhydrite. From these cements, concrete cubes of an edge length of 20 cm were formed (cement content 325 kg/m$^3$, aggregate 0 to 25 mm, good particle size distribution curve, w/c = 0.55.)

|  | Unmixed Porltand Cement Clinker | Mixture of Portland Cement Clinker and Marl Clinker |
|---|---|---|
| Flow in cm | 35 | 38 |
| Compressive Stength |  |  |
| after 40 hours | 115 | 135 |
| 7 days | 307 | 319 |
| 28 days | 411 | 436 |

The simultaneous production of concrete cover slabs showed much better workability of the conrete made from the cement with a marl clinker content. The formation of cracks in the hardened state was also noticeably reduced in this concrete.

What we claim is:

1. A cement comprising at least two clinkers of which one is a Portland cement clinker of conventional composition and the other is at least one clinker burned at temperatures within a range of up to about 1200° C at the most, wherein at least one porous marl clinker opened at temperatures between 450° and 1250° C by means of a burning process and containing hydratizable mineral phases of low calcium content and 0 to 30 percent by weight related to the marl clinker of glass phases is contained in addition to said Portland cement clinker of conventional composition, the weight ratio of the content in the Portland cement clinker to marl clinker is 25:1 to 1:1.

2. A cement according to claim 1, wherein at least one porous marl clinker containing as said mineral phases and glass phases ternary compounds of low calcium content selected from the group consisting of gehlenite, melilite, akermanite, brownmillerite, 4 CaO.Al$_2$O$_3$.Fe$_2$O$_3$, anorthite, grossularite, diopside, monticellite, merwinite and spurrite is contained in addition to the Portland cement clinker.

3. A cement according to claim 2, wherein the marl clinker contains 10 to 100 percent by weight related to the amount of marl clinker in the cement of said ternary compounds selected from said group.

4. A cement according to claim 2, wherein the marl clinker contains 30 to 100 percent by weight related to the amount of marl clinker in the cement of said ternary compounds selected from said group.

5. A cement according to claim 2, wherein the marl clinker contains 50 to 100 percent by weight related to the amount of marl clinker in the cement of said ternary compounds selected from said group.

6. A cement according to claim 1, wherein the weight ratio of the content in Portland cement clinker to marl clinker is 10:1 to 4:1.

7. A cement according to claim 1, wherein at least one porous marl clinker containing as said mineral phases calcium silicates of low calcium content is contained in addition to the Portland cement clinker.

8. A cement according to claim 7, wherein said marl clinker contains 5 to 100 percent by weight related to the amount of marl clinker in the cement of dicalcium silicate.

9. A cement according to claim 8, wherein said marl clinker contains 20 to 100 percent by weight related to the amount of marl clinker in the cement of said dicalcium silicate.

10. A cement according to claim 1, wherein at least one porous marl clinker containing as said mineral phases calcium aluminates of low calcium content is contained in addition to the Portland cement clinker.

11. A cement according to claim 10, wherein said marl clinker contains 5 to 100 percent by weight related to the amount of marl clinker of said calcium aluminates of low calcium content.

12. A cement according to claim 11, wherein said marl clinker contains 15 to 100 percent by weight related to the amount of marl clinker of said calcium aluminates of low calcium content.

13. A cement according to claim 1, wherein at least one porous marl clinker containing as said mineral phase an anhydrite formed of the reaction of decarbonated calcium carbonate and sulfur compounds which had been present in the marl clinker raw materials during the burning process is contained in addition to the Portland cement clinker.

14. A cement according to claim 2, wherein at least one porous marl clinker containing as said mineral phases solid solutions composed of at least two components selected from the group consisting of ternary compounds of low calcium content, said calcium silicates of low calcium content and calcium aluminates of low calcium content is contained in addition to the Portland cement clinker.

15. A cement according to claim 1, wherein at least one porous marl clinker containing as said mineral phases and glass phases at least one component of a multisubstance system formed by participation of substances derived from the secondary components of the marl clinker raw materials, said substances being selected from the group consisting of alkaline compounds, sulfur compounds, iron compounds, and fluor compounds is contained in addition to the Portland cement clinker.

16. A cement according to claim 2, wherein the marl clinker contains a proportion of melt.

17. A cement comprising at least two clinkers of which one is a Portland cement clinker of conventional composition and the other is at least one clinker of low calcium content burned within a temperature range of up to 1200° C at the most wherein at least one porous marl clinker opened by means of a burning process at temperatures between 450° and 1250° C and containing hydratizable mineral phases of low calcium content and 0 to 30 percent by weight related to the amount of marl clinker in the cement of glass phases and at least one conventional cement additive selected from the group consisting of blast furnace slag, trass, fly ash, natural pozzolana, artificial pozzolana, cement raw meal, rock flour, calcium sulfate, dihydrate gypsum, and anhydrite, is contained in addition to the Portland cement clinker and said Portland cement clinker and said at least one porous marl clinker are in a weight ratio of from 25:1 to 1:1.

18. A cement according to claim 17, wherein said rock flour contained in limestone rock flour in an amount of 5 to 15 percent by weight related to the amount of marl clinker in the cement.

19. A cement according to claim 12, wherein at least one porous marl clinker containing as said hydratizable mineral phases of low calcium content and said glass phases 10 to 95 percent by weight of at least one ternary compound of low calcium content selected from the group consisting of gehlenite, melilite, akermanite, brownmillerite, 4 $CaO.Al_2O_3.Fe_2O_3$, anorthite, grossularite, diopside, monticellite, merwinite and spurrite and 5 to 90 percent by weight of calcium silicates of low calcium content is contained in addition to the Portland cement clinker.

20. A cement according to claim 17, wherein at least one porous marl clinker containing as said mineral phases of low calcium content and glass phases 10 to 90 percent by weight of at least one ternary compound of low calcium content selected from the group consisting of gehlenite, melilite, akermanite, brownmillerite, 4 $CaO.Al_2O_3.Fe_2O_3$, anorthite, grossularite, diopside, monticellite, merwinite and spurrite, at least 5 to 85 percent by weight of calcium silicate of low calcium content and at least 5 to 85 percent by weight of calcium aluminate of low calcium content, each related to the amount of marl clinker in the cement, is contained in addition to the Portland cement clinker.

21. A cement according to claim 17, wherein at least one porous marl clinker containing as said hydratizable mineral phases of low calcium content and glass phases at least one ternary compound of low calcium content selected from the group consisting of gehlenite, melilite, akermanite, brownmillerite, 4 $CaO.Al_2O_3.Fe_2O_3$, anorthite, grossularite, diopside, monticellite, merwinite and spurrite, and at least one component made up of a multisubstance system formed by participation of substances derived from the secondary components of the marl clinker raw materials, these substances being selected from the group consisting of alkaline compounds, sulfur compounds, iron compounds, and fluor compounds, is contained in addition to the Portland cement clinker.

22. A cement according to claim 17, wherein Portland cement clinker and porous marl clinker are contained in a weight ratio of Portland cement clinker to marl clinker of 10:1 to 4:1.

23. In a process for the production of a cement comprising Portland cement clinker of conventional composition and at least one porous marl clinker opened by burning at temperatures of 450° to 1250° C, said marl clinker containing hydratizable mineral phases of low calcium content and 0 to 30 percent by weight of glass phases, the improvement comprising the steps of burning Portland cement raw meal to Portland cement clinker, adding, under utilization of the heat liberated in the subsequent cooling of the hot Portland cement clinker, at least one of the raw materials provided for obtaining said marl clinker, these materials being selected from the group consisting of tea green marls, calciferous clays, marls, lime marls, argillaceous limestone rocks, marl slates, shales, clay slates, phyllites, lime phyllites, ultramafic rocks, and dolomites, to the hot Portland cement clinker after its having passed the maximum temperatures of the burning process, within the cooling zone of the process, said raw materials being heated to the desired temperatures of 450° to 1250° C as a result of the direct contact with the hot Portland cement clinker, and subsequently cooling off both clinkers, said marl clinker raw materials being added to the hot Portland cement clinker in a weight ratio of from 1:1 to 1:25.

24. A process according to claim 23, wherein said marl clinker raw materials selected from said group are heated to a desired temperature of 700° to 1100° C.

25. A process according to claim 23, wherein said marl clinker raw materials selected from said group are added to the hot Portland cement clinker in a coarse state with a particle size of 5 to 100 mm.

26. A process according to claim 23, wherein at least one conventional cement additive selected from the group consisting of blast furnace slag, trass, fly ash, natural pozzolana, artificial pozzalana, cement raw meal, rock flour, calcium sulfate, dihydrate gypsum, and anhydrite, is added to the mixture of Portland cement clinker and at least one porous marl clinker.

27. A process according to claim 23, wherein said marl clinker raw materials are added to the Portland cement clinker of conventional composition in weight ratios of 1:4 to 1:10 each of marl clinker raw materials given as burned marl clinker to Portland cement clinker of conventional composition.

* * * * *